(12) United States Patent
Harrington et al.

(10) Patent No.: US 7,302,690 B2
(45) Date of Patent: Nov. 27, 2007

(54) METHOD AND APPARATUS FOR TRANSPARENTLY SHARING AN EXCEPTION VECTOR BETWEEN FIRMWARE AND AN OPERATING SYSTEM

(75) Inventors: Bradley Ryan Harrington, Austin, TX (US); Stephen Dale Linam, Austin, TX (US); James A. Lindeman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 10/631,062

(22) Filed: Jul. 31, 2003

(65) Prior Publication Data

US 2005/0027972 A1 Feb. 3, 2005

(51) Int. Cl.
*G06F 13/24* (2006.01)
*G06F 9/06* (2006.01)
*G06F 11/07* (2006.01)

(52) U.S. Cl. ............... 719/318; 710/269; 712/222; 714/25; 714/28; 714/30; 718/102

(58) Field of Classification Search ............... 719/318; 703/28; 710/269; 712/222–224, 227, 228; 714/25, 28, 30, 46–48; 717/124; 718/102
See application file for complete search history.

(56) References Cited

U.S. PATENT DOCUMENTS

| 4,768,149 | A | * | 8/1988 | Konopik et al. ............ 710/47 |
| 4,809,157 | A | * | 2/1989 | Eilert et al. ............... 718/104 |
| 5,065,354 | A | * | 11/1991 | Jons et al. ................. 714/5 |
| 5,446,877 | A | * | 8/1995 | Liu et al. .................... 714/1 |
| 5,455,919 | A | * | 10/1995 | Brewer et al. ............. 719/321 |
| 5,586,301 | A | * | 12/1996 | Fisherman et al. ......... 711/152 |
| 5,794,063 | A | * | 8/1998 | Favor ......................... 712/23 |
| 5,867,658 | A | * | 2/1999 | Lee ........................... 709/222 |
| 5,909,567 | A | * | 6/1999 | Novak et al. .............. 712/208 |
| 6,397,382 | B1 | * | 5/2002 | Dawson ..................... 717/130 |
| 7,085,705 | B2 | * | 8/2006 | Traut ......................... 703/23 |
| 7,133,951 | B1 | * | 11/2006 | Bourekas ................... 710/260 |
| 2004/0123086 | A1 | * | 6/2004 | Rothman et al. ........... 713/1 |

OTHER PUBLICATIONS

"Itanium™ Processor Floating-point Software Assistance and Floating-point Exception Handling." Intel Corp., Jan. 2000.*
Jones, Steve. "Using spinlocks in a symmetric multiprocessing environment." Tech Specialist, v2, n10, p. 15(6), Oct. 1991.*
IBM Technical Bulletin: NNRD447149. "Method to Prevent Multiple Processes After Taking Exceptions To Enter Open Firmware In a Symmetrical Multiprocessor machine", Published Jul. 1, 2001.*

* cited by examiner

*Primary Examiner*—William Thomson
*Assistant Examiner*—Richard Pantoliano, Jr.
(74) *Attorney, Agent, or Firm*—Duke W. Yee; Diana R. Gerhardt; Wayne P. Bailey (57) ABSTRACT

A method, apparatus and computer instructions for handling exception vectors by firmware. An exception vector is identified to form an identified exception vector when control is passed from an operating system to the firmware. The identified exception vector is saved to form a saved exception vector. The identified exception vector is then replaced with a substitute vector; and the saved exception vector is restored when control is returned to the operating system to form a restored exception vector. At that point, the restored exception vector is again used to perform error and debugging processes.

16 Claims, 4 Drawing Sheets

METHOD AND APPARATUS FOR TRANSPARENTLY SHARING AN EXCEPTION VECTOR BETWEEN FIRMWARE AND AN OPERATING SYSTEM

BACKGROUND OF THE INVENTION

1. Technical Field

The present invention relates generally to an improved data processing system and in particular to a method and apparatus for managing vectors. Still more particularly, the present invention provides a method, apparatus, and computer instructions for sharing exception vectors.

2. Description of Related Art

During execution of programs in a data processing system, events or errors may occur requiring attention or handling. When these types of events or errors occur, an exception may be generated. An exception is a situation that requires prompt attention of the processor or central processing unit (CPU). Exceptions may be internally generated or externally generated. Internally generated exceptions are referred to as traps. Externally generated exceptions are called interrupts.

A trap may occur, for example, when a divide by zero exception is present. An interrupt is typically caused by events in the computer hardware, such as an expiration of a hardware timer, the arrival of data at an input interface, or a bus error.

Typically, when an exception occurs, control in executing instructions is passed to another component to perform actions such as debugging or error analysis. Generally, control is passed to exception vectors that are owned by the operating system. An exception vector is a vector of objects in which different objects are executed depending on the particular exception. Each of these objects may provide different debugging or error processes. A source level debugger is one example of a debugging or error process. In some cases, the component that requires access to the exception vectors is the runtime firmware. For example, the operating system may call the runtime firmware for certain operations, such as an event scan, obtaining the time of day, and a configuration read/write. Currently, the sharing of exception vector does not occur. Instead, exception vectors are owned by firmware early in the boot phase, and later exclusively owned by the operating system.

Therefore, it would be advantageous to have an improved method, apparatus, and computer instructions for sharing exception vectors between firmware and an operating system.

SUMMARY OF THE INVENTION

The present invention provides a method, apparatus and computer instructions for handling exception vectors by firmware. An exception vector is identified to form an identified exception vector when control is passed from an operating system to the firmware. The identified exception vector is saved to form a saved exception vector. The identified exception vector is then replaced with a substitute vector; and the saved exception vector is restored when control is returned to the operating system to form a restored exception vector. At that point, the restored exception vector is again used to perform error and debugging processes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
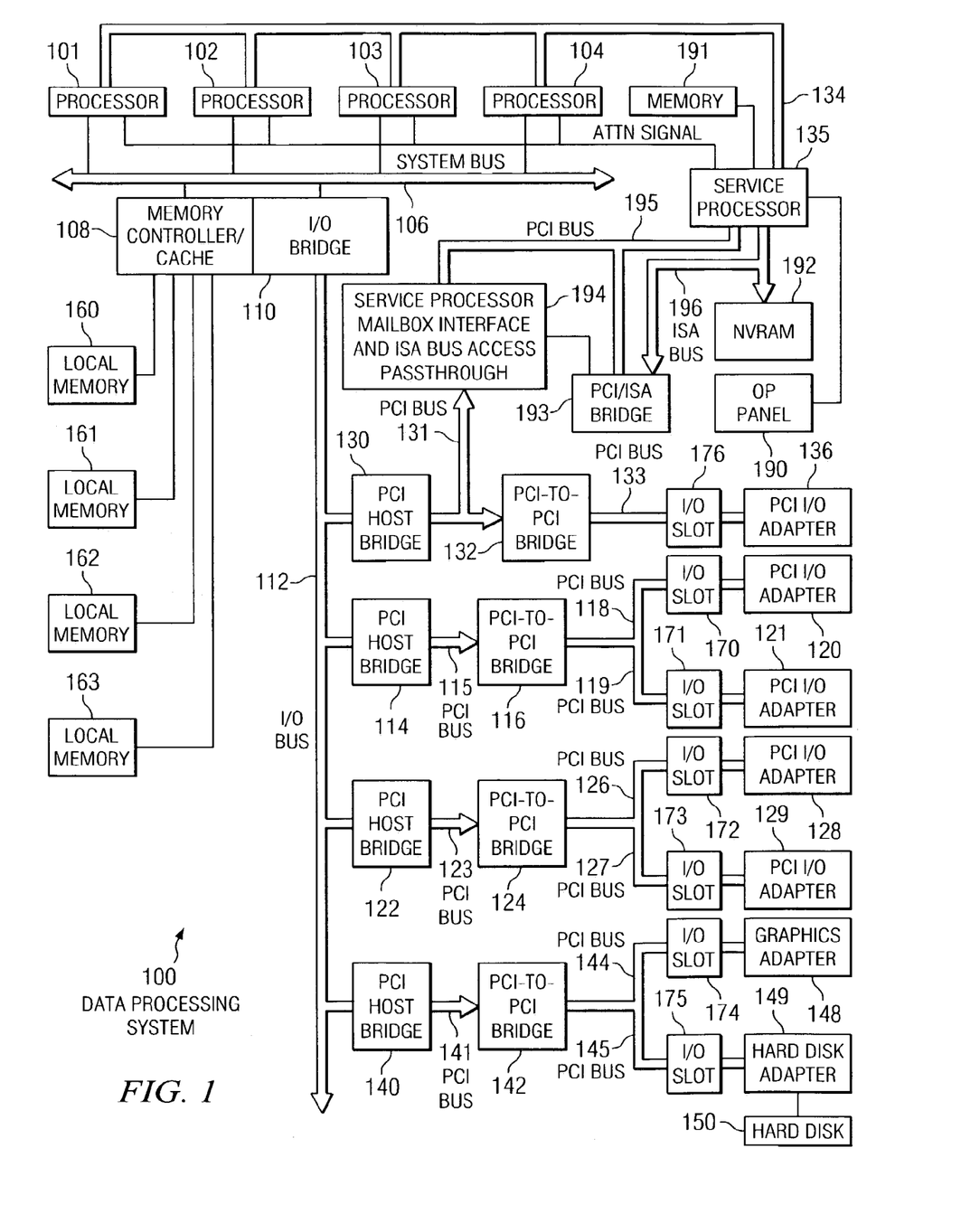
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PC local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between tour and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to 110 bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and Industry Standard Architecture (ISA) bus access pass-through logic 194 and PCI-to-PCI bridge 132. Service processor mailbox interface and ISA bus access pass-through logic 194 forwards PCI accesses destined to the PCI/ISA bridge 193. Non-Volatile Random Access Memory (NVRAM) storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of Joint Test Action Group (JTAG) I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SPATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
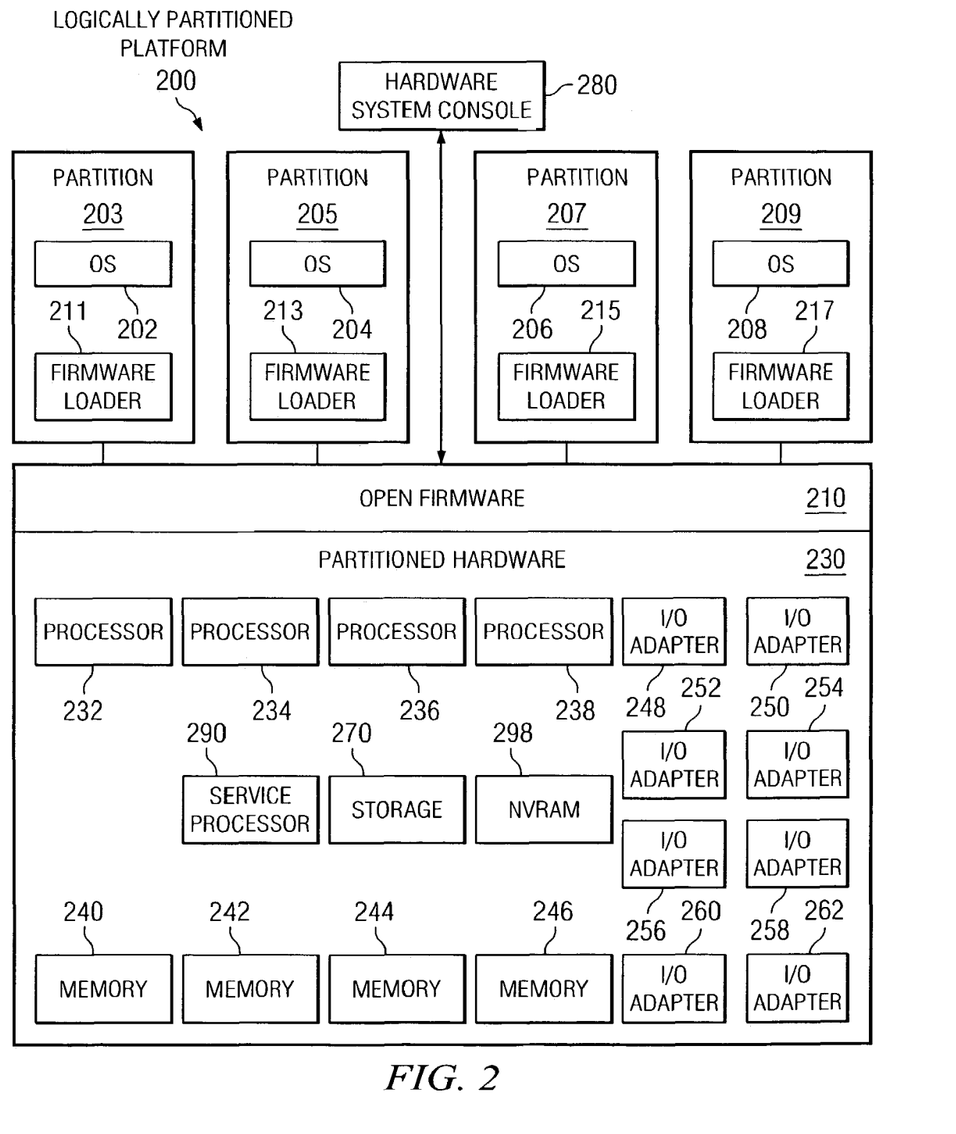
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 280. Console 280 is a separate data processing system from which a system administrator may perform various functions including reallocation of resources to different partitions.

The present invention provides an improved method, apparatus, and computer instructions for transparently sharing an exception vector between runtime firmware and an operating system. In providing enhanced runtime debugging capability of firmware on a running data processing system, access to exception vectors normally owned by the resident operating system is desired. The mechanism of the present invention allows for using these exception vectors without knowledge of the operating system.

The mechanism of the present invention captures or replaces an exception vector needed by the firmware for its operation by saving a copy of the exception vector and replacing that exception vector with its own code. This replacement or capture occurs when control is passed from the operating system to the firmware in these examples. Upon completion of processing, the saved exception vector is restored to its previous state before control is returned to the operating system.

Figure 3:
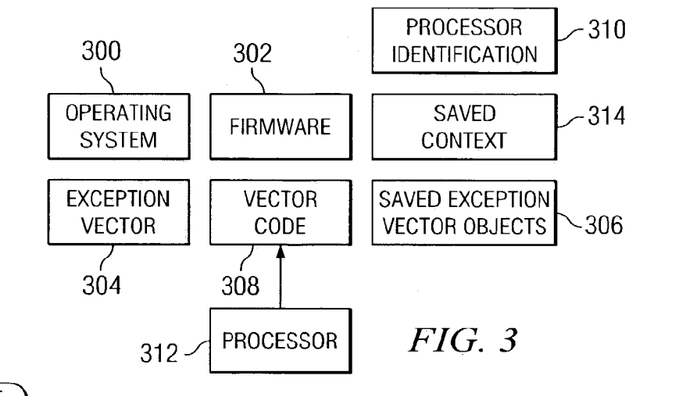
FIG. 3 is a block diagram illustrating components used in transparently sharing an exception vector between an operating system and a runtime firmware in which the present invention may be implemented.

With reference now to FIG. 3, a block diagram illustrating components used in transparently sharing an exception vector between an operating system and a runtime firmware is depicted in accordance with a preferred embodiment of the present invention. Operating system 300 may be an operating system such as operating system 202 in FIG. 2. Firmware 302 may be, for example, the runtime version of firmware loader 211 in FIG. 2.

Operating system 300 calls firmware 302 for certain operations such as an event scan, obtaining the time of day, and a configuration read/write. While firmware 302 is running in response to the call from operating system 300, operating system 300 is briefly suspended. On a symmetric multiprocessor (SMP) system, only the processor, which called the firmware, is suspended.

Upon a program call to firmware 302, firmware 302 saves exception vector 304, which is owned by operating system 300, as saved exception vector objects 306. Exception vector 304 contains objects for processing traps and interrupts for operating system 300. These are the objects that are saved as saved exception vector objects 306. Then, firmware 302 replaces these objects in exception vector 304 with its own code, vector code 308. Vector code 308 may be one or more objects for use in debugging and error analysis functions. Firmware 302 continues running normally with the debugging facilities provided to firmware 302 by vector code 308 that is specifically for use in debugging firmware 302.

After the objects have been saved and replaced in exception vector 304, firmware 302 also saves a copy of the current processor identification (PID) number as saved PID 310. Then, firmware 302 synchronizes the processor, flushes the cache, and resumes normal operation. Flushing is a technical requirement that ensures cache coherency, so that all processors in a symmetric multi-processor system have the same view of the exception vector. Synchronizing ensures this operation is completed before beginning any other operation. Upon completion of the firmware call, the original exception vector, exception vector 304, is restored using saved exception vector objects 306. These saved objects are placed back into exception vector 304. Thereafter, the processor is synchronized and its cache flushed before returning control to operating system 300.

On a SMP system, if any other processor encounters affected exception vector objects 306, firmware 302 holds that processor in a slave loop, until exception vector 306 of operating system 300 is restored, at which time that-processor will resume normal operation.

If a processor, such as processor 312, encounters exception vector 304 during the time control is held by firmware 302, exception vector 304 directs processor 312 to firmware code in firmware 302, which saves the context of processor 312 as saved context 314. Then, the PID of processor 312 is compared with PID 310, which was saved from the processor in which the exception originally occurred.

If the PID matches, processor 312 is the processor that created exception vector 304. In this case, vector code 308 and exception vector 304 executes the normal debugging code. If the PIDs do not match, processor 312 is held in a slave loop until the objects in exception vector 304 are restored, at which time the context of processor 312 is restored, using saved context 314, and processor 312 is released back to the exception vector that it originally encountered.

In these examples, the replacement of exception vectors 304 with vector code 308 occurs only if an internal debugging flag is enabled. In these examples, the debugging flag is located within the data section of the run time partition firmware. If the debugging flag is disabled, operation will continue as normal.

Figure 4:
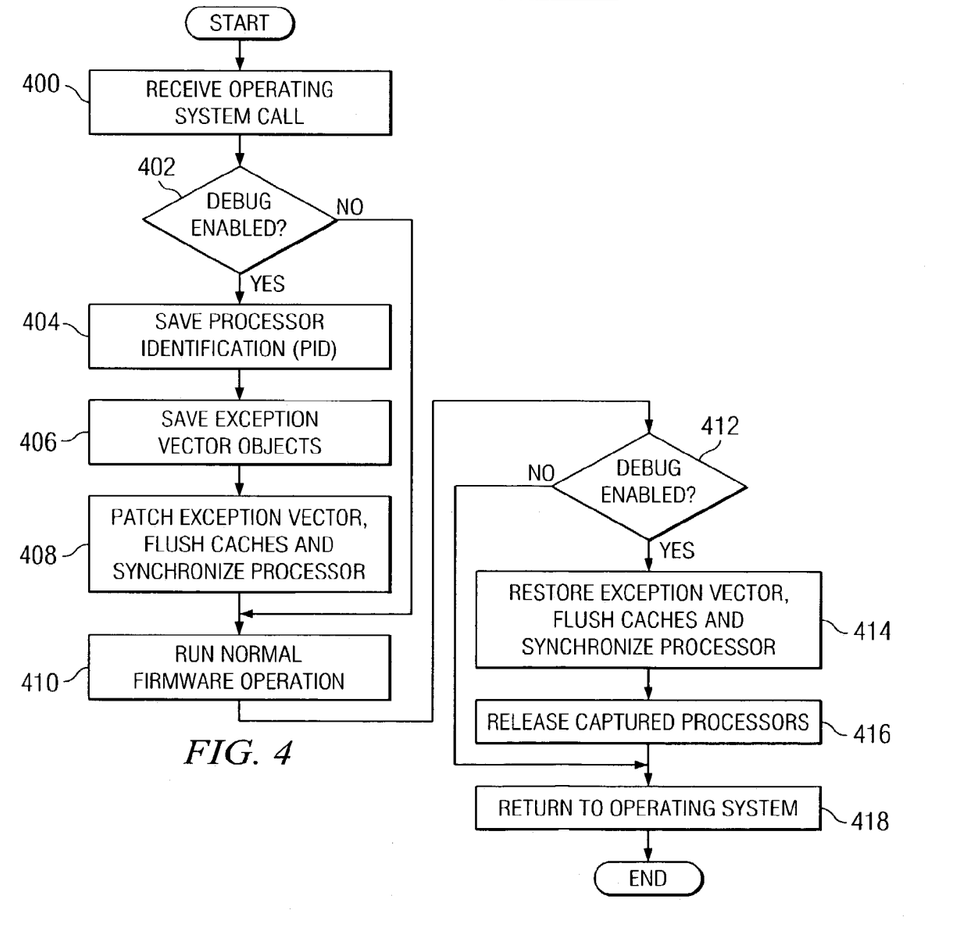
FIG. 4 is a flowchart of a process for inserting and removing exception vectors in accordance with a preferred embodiment of the present invention.

Turning now to FIG. 4, a flowchart of a process for inserting and removing exception vectors is depicted in accordance with a preferred embodiment of the present invention. The process illustrated in FIG. 4 may be implemented in firmware code, such as firmware 302 in FIG. 3.

The process begins by receiving an operating system call (step 400). This call passes control to the firmware. A determination is then made as to whether debugging is enabled (step 402). Debugging may be enabled through the use of a flag in these examples. If debugging is enabled, the processor identification (PID) number is saved (step 404). This PID number is for the processor that generates the exception vector. Thereafter, objects in the exception vector are saved (step 406). The exception vector is patched, caches for the processor are flushed and the processor is synchronized (step 408). In these examples, patching of the exception vector involves replacing the objects in the exception vector with code for use in debugging the firmware.

Thereafter, normal firmware operation occurs (step 410). A determination is made as to whether debugging is enabled. If debugging is enabled, the exception vector is restored, caches of the processor are flushed, and the processor is synchronized (step 414). Any captured processors are released (step 416). In these examples, captured processors are processors other than the original processor creating the exception vector. The processes for handling processors are described in more detail below in FIG. 5. Thereafter, control is returned to the operating system (step 418) with the process terminating thereafter.

With reference again to step 412, if debugging is not enabled, the process proceeds to step 418 as described above. In step 402, the process proceeds directly to step 410 if debugging is not enabled.

Figure 5:
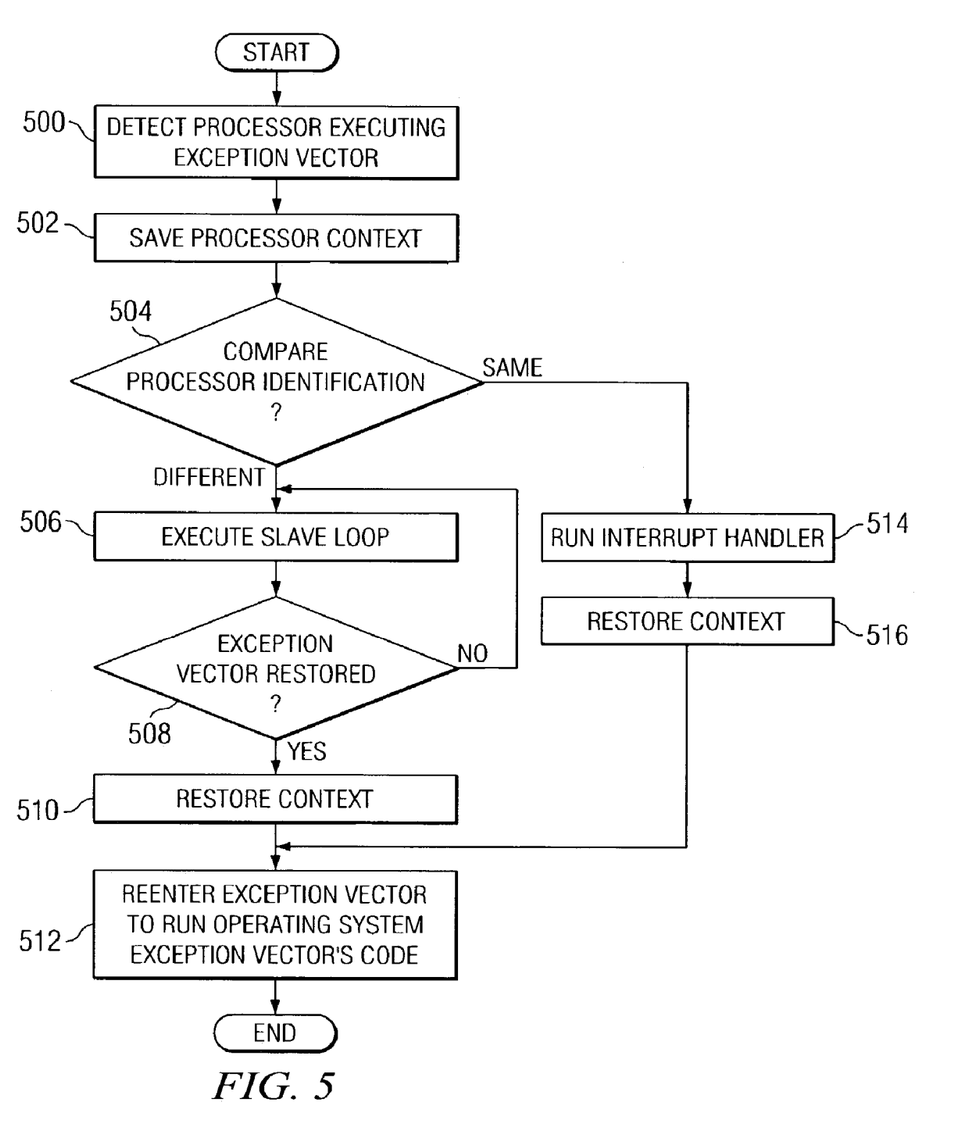
FIG. 5 is a flowchart of an exception vector process for handling multiple processors in accordance with a preferred embodiment of the present invention.

Turning now to FIG. 5, a flowchart of an exception vector process for handling multiple processors is depicted in accordance with a preferred embodiment of the present invention. The process illustrated in FIG. 5 may be implemented in vector code for an exception vector, such as vector code 308 in FIG. 3.

The process begins by detecting a processor executing the exception vector (step 500). The processor context is saved (step 502). Thereafter, a comparison of the PID in the processor with a saved PID is made (step 504). If the PIDs are different, a slave loop is executed in a processor (step 506). Next, a determination is made as to whether the exception vector needs to be restored (step 508). Step 508 is run by the firmware itself, rather than by the exception vector.

If the exception vector has not been restored, the process returns to step 506. Otherwise, the context of the processor is restored (step 510). The exception vector is then reentered to run code for the operating system exception vector (step 512) with the process terminating thereafter.

With reference again to step 504, if the PIDs are the same, an interrupt handler is executed (step 514). In this case, the exception vector run is the one owned by the partition firmware context of the processor is restored (step 516) with the process then proceeding to step 512 as described above.

Thus, the present invention provides an improved method, apparatus and computer instructions for transparently sharing an interrupt vector between runtime firmware and an operating system. The mechanism of the present invention replaces object in the exception vector with code for use by the firmware when a call is made to the firmware from the operating system. When execution of this code is completed, the objects are restored to the exception vector and control is returned to the operating system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for handling exception vectors by firmware, the method comprising:

identifying an exception vector to form an identified exception vector when control is passed from an operating system to the firmware, wherein the exception vector contains objects for processing traps and interrupts for the operating system;

saving the identified exception vector to form a saved exception vector;

replacing the identified exception vector with a substitute vector;

restoring the saved exception vector when control is returned to the operating system to form a restored exception vector, wherein the restored exception vector continues execution; and responsive to a processor, other than an associated processor associated with the saved exception vector, generating an error for the identified exception vector replaced by the substitute vector, placing the processor in a slave loop until the saved exception vector is restored, wherein context for the processor in the slave loop is stored to form a stored context, wherein the processor and the associated processor are identified using processor identification numbers, and wherein the placing step is conditionally performed only if a processor identification number for the processor does not match an associated processor identification number for the associated processor;

wherein the data processing system is a symmetric multiprocessor data processing system having a plurality of logical partitions with each of the plurality of logical partitions (i) having at least one physical processor assigned thereto, and (ii) executing its own operating system which is a different instance from other operating systems executing on other of the plurality of logical partitions.

2. The method of claim 1 wherein the saving, replacing, and restoring steps are conditionally performed only if the data processing system is in a debug mode as determined by a debug flag maintained by the firmware.

3. The method of claim 1, wherein the processor is restored by restoring the context using the stored context and releasing the processor to the restored exception vector.

4. A method operable by firmware in a data processing system for managing exception vectors, the method comprising:

receiving control from an operating system;

replacing, by the firmware, an exception vector with substitute code, wherein the exception vector contains objects for processing traps and interrupts for the operating system; and restoring, by the firmware, the exception vector when control is returned to the operating system, wherein processors, other than a particular processor creating the exception vector, encountering the substitute code are suspended by the firmware until control is returned to the operating system, wherein the processors and the particular processor are identified using processor identification numbers, and wherein the suspension of individual ones of the processors is conditionally performed only if a processor identification number for a given processor of the processors does not match a particular processor identification number for the particular processor;

wherein the data processing system is a symmetric multiprocessor data processing system having a plurality of logical partitions with each of the plurality of logical partitions (i) having at least one physical processor assigned thereto, and (ii) executing its own operating system which is a different instance from other operating systems executing on other of the plurality of logical partitions.

5. The method of claim 4, wherein the processors are suspended by placing the processors in a slave loop by the firmware only if a debug mode for the firmware is enabled.

6. A data processing system for handling exception vectors by firmware, the data processing system comprising:

identifying means for identifying an exception vector to form an identified exception vector when control is passed from an operating system to the firmware, wherein the exception vector contains objects for processing traps and interrupts for the operating system;

saving means for saving the identified exception vector to form a saved exception vector;

replacing means for replacing the identified exception vector with a substitute vector;

restoring means for restoring the saved exception vector when control is returned to the operating system to form a restored exception vector, wherein the restored exception vector continues execution; and means, responsive to a processor, other than an associated processor associated with the saved exception vector, generating an error for the identified exception vector replaced by the substitute vector, for placing the processor in a slave loop until the saved exception vector is restored, wherein context for the processor in the slave loop is stored to form a stored context, wherein the processor and the associated processor are identified using processor identification numbers, and wherein the means for placing the processor in the slave loop is conditionally invoked only if a processor identification number for the processor does not match an associated processor identification number for the associated processor;

wherein the data processing system is a symmetric multiprocessor data processing system having a plurality of logical partitions with each of the plurality of logical partitions (i) having at least one physical processor assigned thereto, and (ii) executing its own operating system which is a different instance from other operating systems executing on other of the plurality of logical partitions.

7. The data processing system of claim 6 further comprising:

means for conditionally invoking the saving means, replacing means, and restoring means only if the data processing system is in a debug mode as determined by a debug flag maintained by the firmware.

8. The data processing system of claim 6, wherein the processor is restored by restoring the context using the stored context and releasing the processor to the restored exception vector.

9. A multi-partitioned data processing system for managing exception vectors, the data processing system comprising:

receiving means for receiving control from an operating system;

replacing means for replacing an exception vector with substitute code, wherein the exception vector contains objects for processing traps and interrupts for the operating system; and restoring means for restoring the exception vector when control is returned to the operating system, wherein processors, other than a particular processor creating the exception vector, encountering the substitute code are suspended until control is returned to the operating system, wherein the processors and the particular processor are identified using processor identification numbers, and wherein the suspension of individual ones of the processors is conditionally performed only if a processor identification number for a given processor of the processors does not match a particular processor identification number for the particular processor;

wherein the multi-partitioned data processing system comprises a plurality of logical partitions with each of the plurality of logical partitions (i) having at least one physical processor assigned thereto, (ii) executing its own operation system which is a different instance from other operating systems executing on other of the plurality of logical partitions, and (iii) executing its own partition firmware which is loaded into the each of the plurality of logical partitions when the partitions are instantiated; and wherein the receiving means, the replacing means and the restoring means are each performed by the partition firmware of a given partition.

10. The data processing system of claim 9, wherein the processors are suspended by placing the processors in a slave loop by the partition firmware of the given partition.

11. A computer program product in a computer recordable-type medium and operable with a data processing system for handling exception vectors by firmware, the computer program product comprising:

first instructions for identifying an exception vector to form an identified exception vector when control is passed from an operating system to the firmware, wherein the exception vector contains objects for processing traps and interrupts for the operating system;

second instructions for saving the identified exception vector to form a saved exception vector;

third instructions for replacing the identified exception vector with a substitute vector;

fourth instructions for restoring the saved exception vector when control is returned to the operating system to form a restored exception vector, wherein the restored exception vector continues execution; and fifth instructions, responsive to a processor, other than an associated processor associated with the saved exception vector, generating an error for the identified exception vector replaced by the substitute vector, for placing the processor in a slave loop until the saved exception vector is restored, wherein the processor and the associated processor are identified using processor identification numbers, and wherein the placing step is conditionally performed only if a processor identification number for the processor does not match an associated processor identification number for the associated processor;

wherein the data processing system is a symmetric multi-processor data processing system having a plurality of logical partitions with each of the plurality of logical partitions (i) having at least one physical processor assigned thereto, and (ii) executing its own operating system which is a different instance from other operating systems executing on other of the plurality of logical partitions.

12. The computer program product of claim 11 wherein the second instructions for saying, the third instructions for replacing, and the fourth instructions for restoring are conditionally performed only if the data processing system is in a debug mode as determined by a debug flag maintained by the firmware.

13. The computer program product of claim 12, wherein context for the processor in the slave loop is stored to form a stored context.

14. The computer program product of claim 13, wherein the processor is restored by restoring the context using the stored context and releasing the processor to the restored exception vector.

15. A computer program product in a computer recordable-type medium and operable with a data processing system for managing exception vectors, the computer program product comprising:

first instructions for receiving control from an operating system;

second instructions for replacing an exception vector with substitute code, wherein the exception vector contains objects for processing traps and interrupts for the operating system; and third instructions for restoring the exception vector when control is returned to the operating system, wherein processors, other than a particular processor creating the exception vector, encountering the substitute code are suspended until control is returned to the operating system, wherein the substitute code provides particular debug code for debugging the computer program product, wherein the processors and the particular processor are identified using processor identification numbers, and wherein the suspension of individual ones of the processors is conditionally performed only if a processor identification number for a given processor of the processors does not match a particular processor identification number for the particular processor;

wherein the data processing system is a symmetric multi-processor data processing system having a plurality of logical partitions with each of the plurality of logical partitions (i) having at least one physical processor assigned thereto, and (ii) executing, its own operating system which is a different instance from other operating systems executing on other of the plurality of logical partitions.

16. The computer program product of claim 15, wherein the processors are suspended by placing the processors in a slave loop by the computer program product only if a debug mode for the computer program product is enabled.

* * * * *